Mar. 6, 1923.　　　　　　　　　　　　　　　　　　　　1,447,312.
A. G. MAASDAM.
GATE AND OPERATING MEANS THEREFOR.
FILED AUG. 13, 1920.
3 SHEETS—SHEET 2.
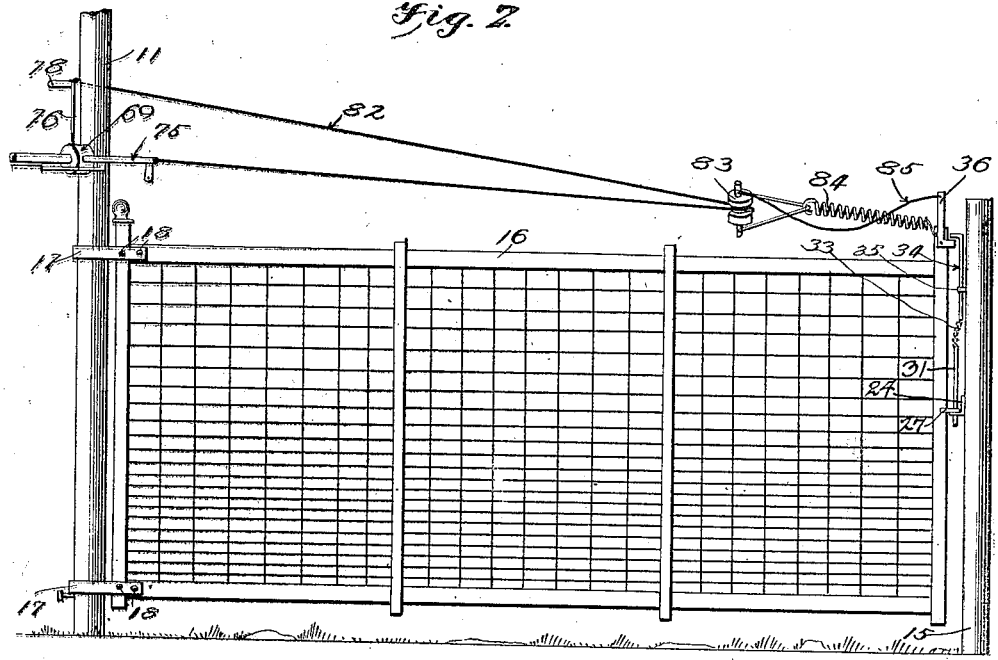
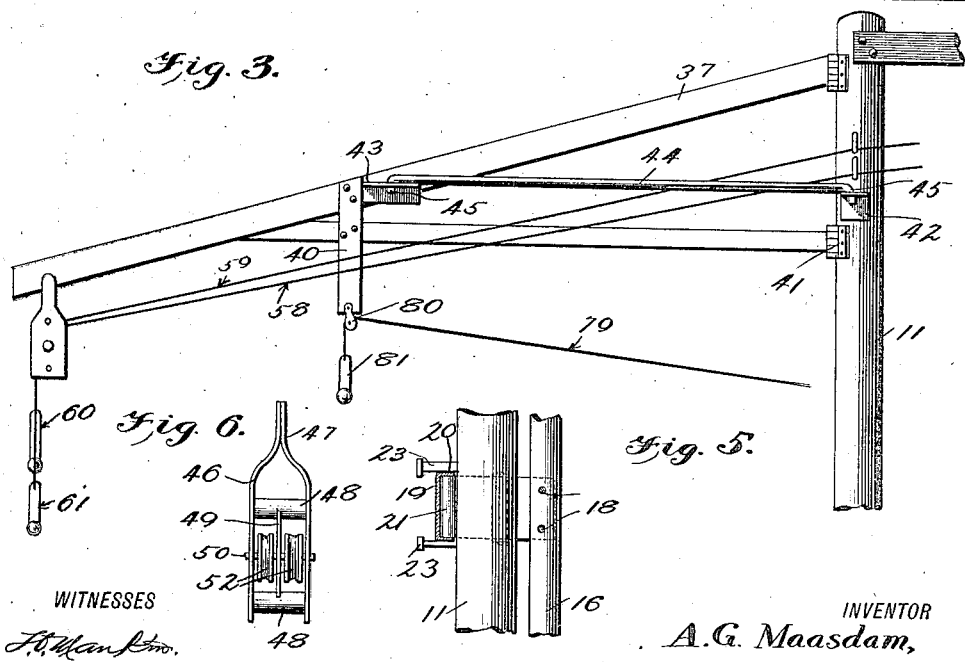
WITNESSES
INVENTOR
A. G. Maasdam,
BY
ATTORNEYS

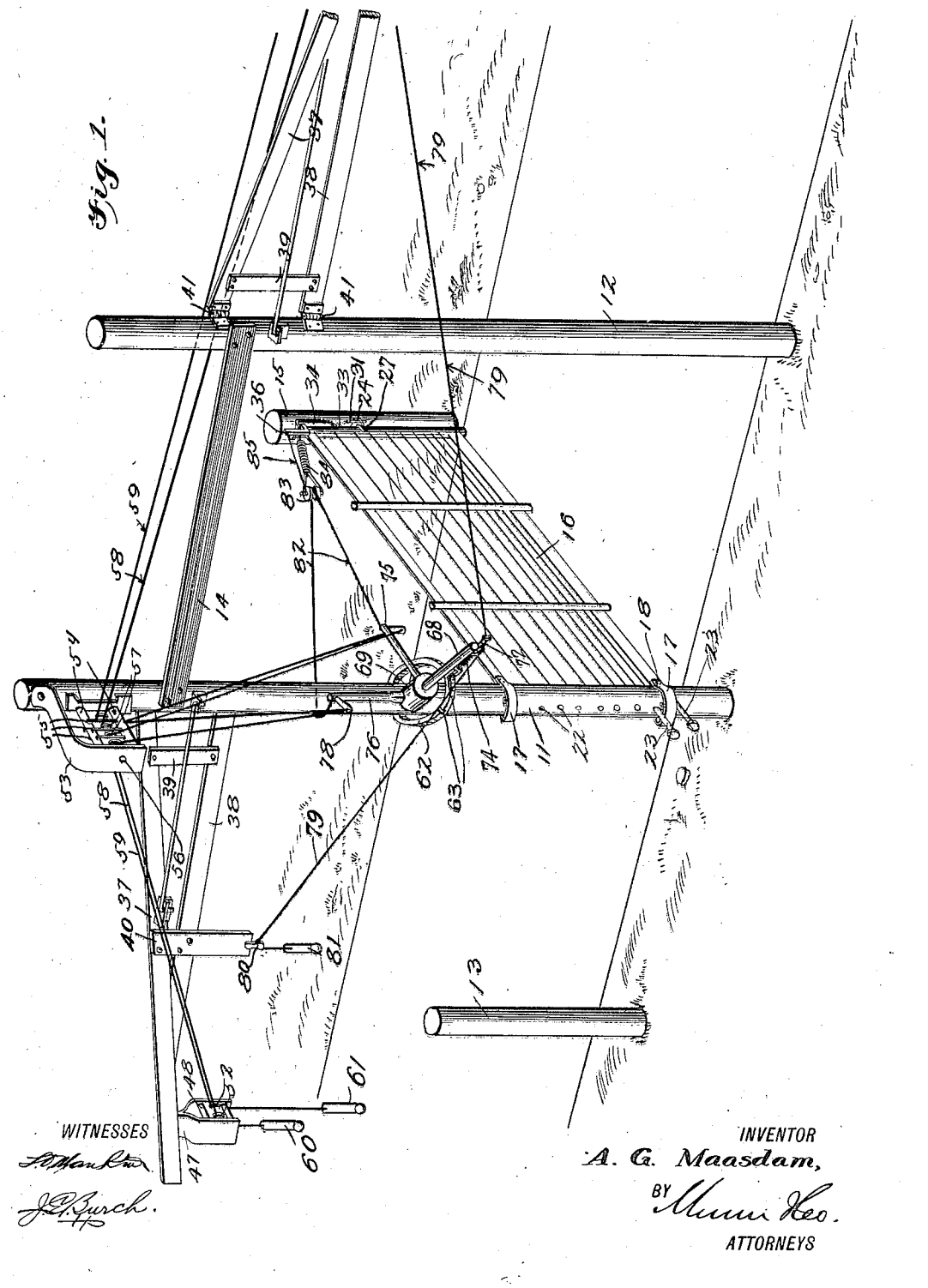

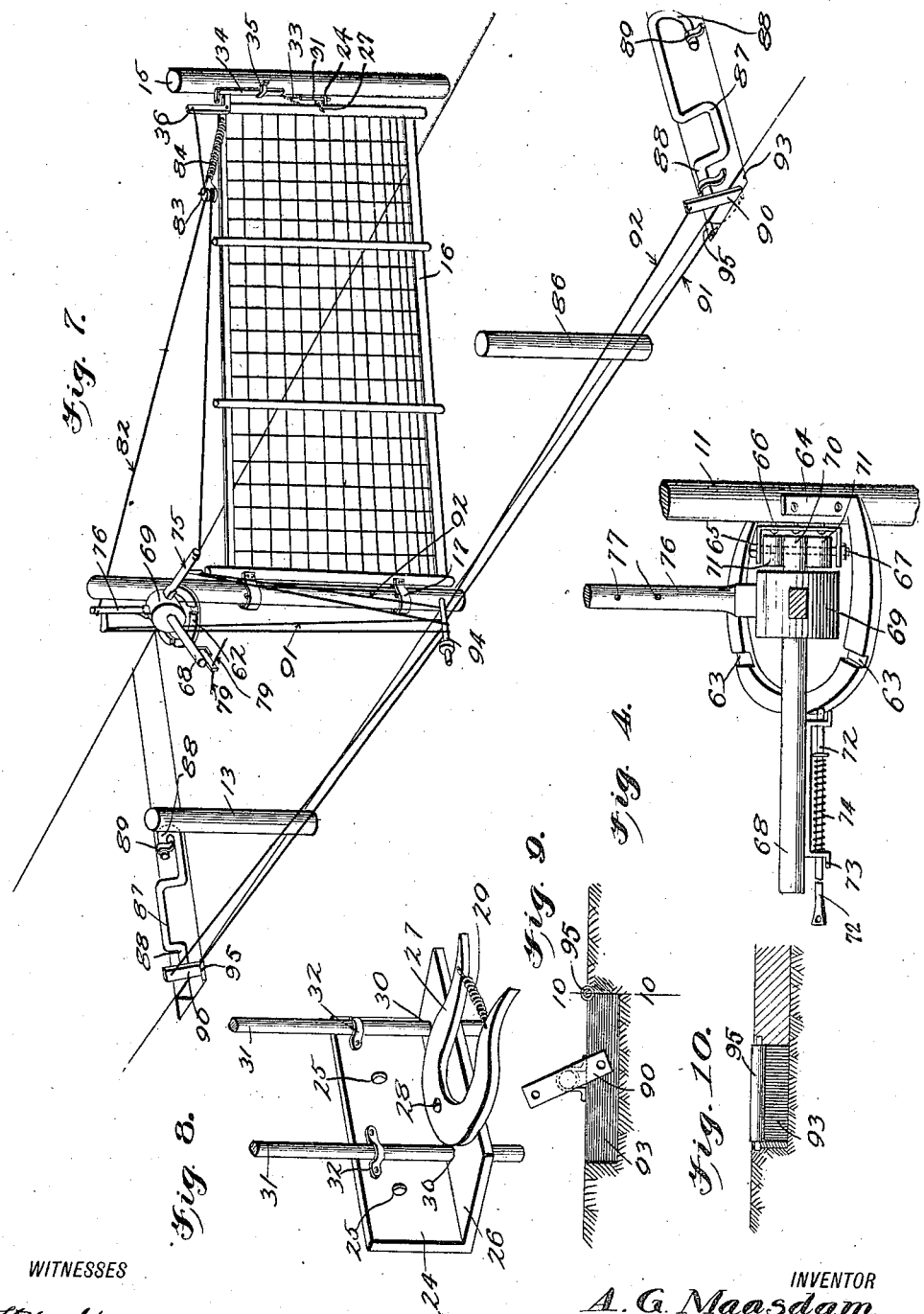

Patented Mar. 6, 1923.

1,447,312

UNITED STATES PATENT OFFICE.

ABRAHAM GRADUS MAASDAM, OF STEAMBOAT SPRINGS, COLORADO.

GATE AND OPERATING MEANS THEREFOR.

Application filed August 13, 1920. Serial No. 403,377.

*To all whom it may concern:*

Be it known that I, ABRAHAM GRADUS MAASDAM, a citizen of the United States, and a resident of Steamboat Springs, in the county of Routt and State of Colorado, have invented certain new and useful Improvements in Gates and Operating Means Therefor, of which the following is a specification.

This invention has reference to gates and operating means or mechanism therefor, and it relates more particularly to farm gates or that type which are especially adapted for use in rural districts to control an entrance on a roadway where it is inexpedient to plant a post, the gate being mounted to swing horizontally from one side of the line of fencing and adapted to be actuated at a convenient distance so as to be opened when passing or approaching the gate and be closed after passing by the said gate, without dismounting from an automobile, horseback, from a farm wagon or rack, even at the top thereof when loaded with hay, or from any other vehicle.

The invention contemplates an improved mounting for the gate whereby the same may be adjusted vertically or raised and lowered in case of heavy snow, frost or muddy roads accompanied by heavy rains; to provide improved means for swinging or operating the gate from either side, permitting the direction of operation to be conveniently reversed or permitting the gate to be swung to an open or closed position at either side, either by hand, or by means over which the wheels of the vehicle are designed to travel in order to exert the necessary pull or strain on the actuating mechanism and in association with said operating mechanism, to provide a novel form of latch to hold the gate in a closed position to span the roadway or drive or to release the same to permit the gate to be opened to either side, said latch mechanism including means for checking or absorbing the shock of the gate when closing, so as to prevent injury to the actuating mechanism or mountings for the gate.

The invention further contemplates an operating means or mechanism for the gate for swinging the same from distant points at either side of the hinged mounting thereof in which the gate is partly sustained or supported by the operating mechanism, and in which an overbalancing or unequalized tension is exerted in combination with a spring, upon the actuation of the operating mechanism, to swing the gate to open and closed positions from points at either side of the gate post, which also serves to support the operating devices and reversing means, as will be subsequently described and pointed out in detail.

For a full understanding of the invention and the merits thereof, reference is to be had to the following description and the accompanying drawings.

While the invention may be adapted to different forms and conditions, or changes in the structure and minor details, without departing from the spirit or essential features thereof, the preferred embodiments are shown in the accompanying drawings, in which:—

Figure 1 is a perspective view of a gate embodying the invention, and illustrating the overhead operating or manipulating means.

Figure 2 is an enlarged fragmentary side elevation showing the gate, latching and reversing mechanism thereof, Figure 3 is an enlarged fragmentary side elevation showing the means for adjusting the supporting arms of the actuating mechanism at different angular positions with respect to the post and roadway or drive, Figure 4 is a fragmentary side perspective view of the actuating and reversing mechanism, Figure 5 is a fragmentary vertical sectional view showing the supporting means or hinge straps for the gate, Figure 6 is an edge view of the pulley or sheave supporting hangers, Figure 7 is a perspective view of the gate showing a modified form of operating means.

Figure 8 is a fragmentary perspective view of the latch and shock absorbing means associated therewith, Figure 9 is a sectional elevation showing a wheel engaging element of the actuating mechanism depicted in Figure 7, and Figure 10 is a sectional view taken on the line 10—10 of Figure 9.

Corresponding and like parts are referred to in the following description and indicated in all the views of the drawings by the same reference characters.

In the form of the invention shown in Figures 1, 2, 3, 4, 5, 6 and 8, there is provided a main upright or post 11 which is mounted at one side of the roadway or drive and at one side of a line of fence forming an entrance way or otherwise, in spaced relation to which is placed a second upright or post 12 of similar height and at the other side a relatively short post 13, all three being disposed in alinement with one side of the roadway or drive. The posts 11 and 12 are preferably connected by a horizontal strut or brace 14 serving to render the posts more rigid in their settings in the ground or other mounting provided therefor.

At the opposite side of the road or driveway is arranged a relatively short post 15 which is disposed opposite to the post 11 and between which the gate 16 operates. The gate may be of any preferred construction so as to check the passage of shocks or otherwise and is pivotally hung for swinging movement by means of pivot hinges or hanger struts 17 which substantially encircle the post 11 and have their extremities connected to the vertical or top and bottom members of the gate 16, as indicated at 18, a plurality of fastening means being employed so as to prevent pivotal action thereof and to properly sustain the weight of the gate, which is made as light as possible. The post 11 is preferably made of piping of suitable diameter and in order to permit free swinging movement of the gate through the medium of the hinges as above set forth, the strips forming the latter are provided at their top and bottom edges with inwardly extending flanges or clips 19 preferably formed integral therewith and bent as described, said clips being apertured to receive the pivots 20 of the rollers 21 forming roller bearings or anti-friction means between the gate post and the frame of the hinge. Means are provided to permit adjustment of the elevation of the gate with respect to the ground surface, in order to allow for heavy snows and the like, and for this purpose, the post is provided with a series of spaced openings 22 at the side thereof opposite to the roadway for receiving supporting pins 23, two of which are employed in spaced relation above and below the hinges so as to support the latter and sustain the weight of the gate thereon against sagging, in cooperation with the operating mechanism as will be subsequently more fully pointed out.

A latch is provided at the post 15 cooperating with the free end of the gate, in order to hold the latter in a closed position and to permit release thereof, in order that the gate may swing to either side against the post 12 or against the post 13. This latch includes an angular supporting bracket or frame 24 suitably apertured as indicated at 25 for attachment to the post 15, which latter is provided with a flattened portion for this purpose. The horizontal flange 26 of the bracket 24 has pivotally mounted thereon, the yoke or U-shaped plate 27, the same having tapered side portions or legs and being pivoted intermediately of the bight portion thereof as indicated at 28, for horizontal pivotal movement. The free ends of the sides or legs are connected by a helical spring 29, which by being mounted at the mouth of the yoke, is adapted to absorb or take the shock of the gate when closing it by engagement with the vertical end member at the free end of the gate, until centralized between the legs or side portions of the yoke. The yoke is adapted for limited horizontal swinging or oscillatory movement and for this purpose horizontal flange 26 is provided with a pair of vertical apertures 30 into which are adapted to fit, a pair of vertical bars 31 which are vertically movable in slots or bearings 32 carried by the vertical portion of the bracket 24 and the post 15, the bars being disposed on opposite sides of the yoke in order to limit the pivotal movement of the latter and to hold the same in a central position when the gate is closed. The upper ends of the bars are connected by chains or cables 33 terminating in a single chain having connection with a vertically movable or slidable inverted L-shaped plate 34 operating beneath a bearing 35 carried at the inner face of the post 15 and adapted to be raised by means of an angular or bell crank lever 36 engaging the horizontal upper end of the plate or bar 34, in order that the bars or pins 31 may be disengaged from the apertures 30 to permit free pivotal or oscillatory movement of the yoke for releasing the gate in order that the same may be opened to either side, as will be hereinafter more particularly specified. In this connection, it may be stated that the pivot 28 is preferably in the form of a bolt, in order that the parts may be readily assembled or disconnected when desired or necessary, such as for repair or renewal purposes.

The operating mechanism includes oppositely extending and inclined arms 37 having horizontal braces 38 arranged therebeneath and connected thereto by struts 39 and 40, the latter extending below the horizontal braces for a purpose to be hereinafter specified. These arms, including the braces thereof are pivoted for horizontal swinging or pivotal movement to the outer faces of the posts 11 and 12, as indicated at 41 and may be thus arranged to swing or hang over the side of the roadway. Means are also provided to hold the same against movement in an adjusted angular position, consisting of an apertured bracket 42 extending horizontally inwardly from the post 11 to which it is secured, while a vertically apertured angular plate 43 is secured to the arm at each side, and provided with the necessary holes or apertures in the horizontal flange thereof for adjusting the arm in any convenient position through the medium of a rod or brace 44 having the ends thereof turned downwardly as indicated at 45 in order to engage the aperture in the outer end of the bracket 42 and the apertures or holes in the plate 43, thus serving to hold the arms in fixed relation to the posts 11 and 12 in convenient position to permit the operation of the mechanism without dismounting from a vehicle or horse. Thus, it will appear that the arms may be swung laterally and adjusted in any desired lateral position so as to extend over the roadway or driveway, or out of the path of the same, as shall be preferred or necessary.

As before mentioned, the struts 40 project below the arms and braces 38 forming portions thereof, and at the outer ends of the arms are suspended hangers 46 consisting of strips disposed in spaced relation at their lower ends and connected to each other and to the arms at their upper ends, as indicated at 47, the lower portions being connected by spacing means or sleeves 48 between which a vertical partition or division member 49 is disposed to divide the hanger transversely. A shaft 50 extends through the side members and division member 49 and rotatably carries a pair of pulleys or sheaves 52 over which operating cables or ropes are trained for operating the gate to open and close the same by releasing the latch and other mechanism as will be hereinafter more particularly specified. The post 11 has mounted on the side thereof opposite the roadway or driveway, a pulley frame 53 suitably retained in a vertical position to extend outward from the post or upright and having spaced bracing members 54 divided by division plates 55 and receiving the horizontal shaft 56 on which are rotatably journalled, a plurality, preferably four, pulleys 57 designed to movably receive and have trained thereover cables leading to the extremities of the opposite arms 37, which cables are numbered 58 and 59 respectively, and which extend over the pulleys 52 heretofore referred to.

At the free ends of the ropes or cables 58 and 59 are provided handles 60 and 61, the same being weighted so as to maintain the cables taut and in convenient position for operation. Means is provided for reversing the direction of swinging, and for this purpose there is mounted at the back of the post 11 between the top posts 12 and 13 and intermediately of the height thereof slightly above the top edge of the gate, a horizontally disposed notched segment 62 consisting of a strip having notches 63 therein and having its ends 64 bent vertically and secured to the main post 11. Two of the notches 63 are provided at either side, and also secured to the post is a U-shaped hanger or staple 65, the attaching means thereof being designated at 66 extending through the bight portion between the side portions and forming the connecting or cross member thereof, said side portions or ends receiving a bolt or bearing 67 for pivotally mounting for horizontally swinging movement, a shaft 68 having an enlarged hub 69 and bearing engaged on the bolt or bearing 67 at its end portion 70, while rollers 71 are provided at either side thereof to take up thrusts. This ratchet mechanism includes a spring-pressed bolt or pawl 72 carried by an angular guide member or casing 73 beneath the shaft, the inner end of the bolt being forced outwardly by a spring 74 to engage one of the notches 63 provided at each side of the axis of the post and the segment or relatively circular and horizontally disposed notched plate. Extending from the hub 69 substantially at right angles to each other, are arms 75 and 76 each provided with a series of openings or sockets 77 in which are adjustably mounted right angularly extending pins 78 affording means for adjusting the length of the arms at the points of connection of the cables or ropes 58 and 59 thereto. As illustrated, the cables 58 from opposite sides are connected to one arm and the cables 59 are connected to the other arm, the arms and hub rocking or turning on the shaft 68 and serving as means for producing an overbalanced or unequal tension on either side to reverse the direction or swing, as well as to open or close the gate as will be hereinafter more fully pointed out.

Secured to the free end of the bolt 72 is the intermediate portion of a cable or rope 79 which extends in opposite directions and angularly toward the driveway, where its opposite ends are trained over pulleys or sheaves 80 suspended at the lower ends of the braces or struts 40 which serve as hangers for this purpose, handles 81 being provided on the free ends of the cable 79 and weighted as usual, in order to maintain the same in convenient position to be grasped under all conditions. These handles and the cable serve as means for swinging the shaft in an arcuate path on the segment, in order that the bolt may be brought into engagement with either one of the notches 63 so as to reverse the direction of swinging of the gate as will be made clear hereinafter. Mounted upon the top of the gate at the free end of the same, is the angular or bell crank lever 36 heretofore referred to, the lower and shorter or horizontal arm thereof being arranged to extend beneath the horizontal portion of the plate 34. Connected to the free ends of the arms 75 and 76 are the extremities of a V-shaped flexible connection 82 consisting of a length of wire, cable or rope trained around a pulley or chain 83 which is connected to the free end of the gate through the medium of a contractile helical spring 84 and to the upper end or arm of the lever 36 through the medium of a relatively loose or slack chain or cable 85 which is adapted to be drawn taut upon the pull on the cable 82, after expanding and lessening the spring 84 so as to swing the lever 86 on its pivot and raise the pins or bars 31, in order to release the yoke 27 whereby the gate may be opened in either direction. Thus, supposing the parts in the position opposite to that shown in Figure 1 of the drawings, by pulling on either handle 60 and corresponding cable 58, and the bolt 72 engaged in the notch 63 at the left the arm 76 will be operated or raised to a vertical position, thus swinging the arm 75 downwardly to a horizontal position and causing pull on that side of the cable 82 which is connected thereto or to the arm 76 as will be further explained. This results in the expansion of the spring 84 so as to lengthen it and results in pull on the connection 85 with the result that the gate latch will be released, that is the bell crank lever is swung on its pivot so that the inner or horizontal arm thereof will raise the angular plates 34, thus disengaging the pins, bolts or bars 31 from the apertures or openings 30, whereby to permit the yoke 27 to swing at either side. In this instance, the overbalancing or unequalized tension exerted upon the opposite sides or laps of the cable 82 will result in permitting the yoke 27 to swing with the gate, the latter being swung toward post 12 or at that side toward which the strain or tension is exerted on the cable 82 so as to pull on the free end of the gate to swing the same, in addition to helping to sustain the gate in a true position for free swinging movement. Of course, it is to be understood that the corresponding cable and handle may cause the same operation at either side or arm, while pull upon the cable 59 at either side, through the medium of its handle 61 will result in the arm 75 being raised and the arm 76 lowered to a horizontal position at the left opposite to the position of the arm 75 as shown in Figure 1 and thus exerting opposite pull on the cable 82 to release the latch and open the gate toward the post 13 from a closed position or close the gate from the open position, the yoke serving to retain the gate against movement after absorbing shock by the spring 29, through the medium of the pins or bars 31 engaging upon opposite side edges thereof. In order to cause the gate to swing against the stop post 13, pull is exerted on one of the handles 81 and the corresponding cable 79, which will result in swinging the shaft 68 in an arcuate path, after releasing the bolt 72 from the notch 63 at one side, to the notch at the opposite side, so that the pull will be oppositely exerted on the cable 82. However, the operation is otherwise the same and when the gate is closed, the yoke 27 will be held rigidly in alinement therewith by the rods or bars 31, thus preventing accidental opening as well as serving to keep in stock or the like.

Thus, it will be apparent that by increasing the tension on the spring 84, at either side, and the tendency to equalize the tension by movement of the cable 82 on the pulley or sheave 83, that the gate may be swung to either side, after the release or disengagement of the latch. The same operation takes effect in the reverse direction when the gate is being closed, the latch being open and the yoke 27 swung to one side or the other to receive the free end of the gate against the cushioning and shock absorbing spring 29, in order to avoid injury to the parts. Of course, the arm at the side of the stop post 12 will be much shorter than the arm at the side of the stop post 13, in view of the fact that the former is secured to the post 12 which is spaced from the post 11, while the latter is secured to the post 12 to overhang the short stop post 13.

In the form of the invention shown in Figures 7, 9 and 10, the structure is the same, with the exception of the operating means which is adapted to be actuated by means over which the wheels of the vehicle are designed to travel in order to exert the necessary pull or strain on the actuating mechanism in association with said operating mechanism and latch. In lieu of the arms and cables as heretofore described, there is provided a short stop post 86, while the arms 75 and 76 and the cable 82 are as heretofore described. However, in order to actuate the ratchet mechanism and arms, there is mounted or embedded in and across the road or driveway, a double or two-way crank 87 having bearing portions 88 mounted in bearings 89 and having one end provided with a cross arm 90 to which cables 91 and 92 are connected at the opposite ends of said cross arm, which is adapted to operate within a recess or ditch 93 cut at one side of the driveway or road. These cables extend around pulleys or an anti-friction guide member 94 carried by the lower end of the post 11 and are then extended upwardly to the pins carried by the arms 75 and 76. The reversing cable may be actuated in any suitable manner, as heretofore described, for moving the shaft in an arcuate path to reverse the direction of swing of the gate. Thus, it will appear that the gate may be operated by causing the wheels of the vehicle to engage upon the respective crank portion of the two-way or double crank 87, which is disposed uppermost, one part being raised while the other is lowered, in order that the reverse swinging may be effected, merely by causing the wheels of the vehicle to roll over said crank portions as it is thought will be obvious. Of course, the latch mechanism and the counterbalancing or overbalancing mechanism associated therewith, will operate as heretofore described. Thus, it will appear that the gate can be operated without dismounting from the vehicle or horse, in either of the manners specified. Furthermore, the attachment can be conveniently applied to any gate or door of the type described so long as it is provided with a hinge connection which keeps the free end of the gate or door at an equal distance from the main post 11 during the opening and closing, may be constructed and installed economically, is simple and reliable, in addition to being adaptable as a stock gate, rendering it unnecessary to approach ahead of the stock to open the gate. It will also appear that the device may be operated by hand or by a suitable prime mover operated by electricity or otherwise and since the latch works in harmony with the opening and closing attachment or mechanism, the gate will be automatically locked and unlocked when operated. Furthermore, the device may be operated from any sort of a vehicle, and as conveniently from the top of a load of hay as from an automobile according to modern uses. The cables 91 and 92 engage rollers 95.

In view of the foregoing, it is thought that the operation of the device will be readily understood, and in view of the simplicity and practical value that it will commend itself to those skilled in the art.

Having thus described my invention, what I claim is:

1. A gate and operating means therefor comprising a main post, a gate hinged to swing relative thereto, a latch post with which the free end of the gate cooperates, a latch cooperative between the gate and the last named post, and operating means for opening and closing the gate, including means for causing unequalized tension at one side of the gate or the other, to cause swinging thereof, said means causing simultaneous disengagement of the latch, and said latch including a swinging yoke, a a shock absorbing spring adapted to be engaged by the gate and carried by said yoke, said yoke receiving the free end of the gate, and means forming a part of the latch to hold the latch yoke against swinging movement when the gate is closed.

2. The combination with a main post and spaced stop posts disposed in alinement; of a gate hinged to said main post, a latch post cooperative with the free end of the gate, latch means cooperative between the gate and post, said latch being carried by the post, means carried by the gate for releasing said latch and for holding the same in engaged position, a horizontally swingable ratchet member carried by the main post and provided with arms extending radially therefrom, a cable connected to the extremities of said arms and bent upon itself, a pulley around which said cable operates, said pulley being connected to the latch operated means, a spring between the pulley and the free end of the gate, and operating cables connected with the arms and provided with means for exerting pull thereon at one side or the other.

3. The combination with a main post and spaced stop posts disposed in alinement; of a gate hinged to said main post, a latch post cooperative with the free end of the gate, latch means cooperative between the gate and post, said latch being carried by the post, means carried by the gate for releasing said latch and for holding the same in engaged position, a horizontally swingable ratchet member carried by the main post and provided with arms extending radially therefrom, a cable connected to the extremities of said arms and bent upon itself, a pulley around which said cable operates, said pulley being connected to the latch operated means, a spring between the pulley and the free end of the gate, and operating cables connected with the arms and provided with means for exerting pull thereon at one side or the other to raise or lower the same in opposite directions and cause pull on the pulley cable at one side or the other to release said latch and expand said spring, to cause the gate to swing to one side or the other against one of said stop posts and to close the same.

4. The combination with a main post and spaced stop posts disposed in alinement; of a gate hinged to said main post, a latch post cooperative with the free end of the gate, a latch being carried by the post, means carried by the gate for releasing said latch and for holding the same in engaged position, a horizontally swingable ratchet member carried by the main post and provided with arms extending radially therefrom, a cable connected to the extremities of said arms and bent upon itself, a pulley around which said cable operates, said pulley being connected to the latch operated means, a spring between the pulley and the free end of the gate, operating cables connected with the arms and provided with means for exerting pull thereon at one side or the other to raise or lower the same in opposite directions and cause pull on the pulley cable at one side or the other to release said latch and expand said spring, to cause the gate to swing to one side or the other against one of said stop posts and to close the same, and means for reversing said ratchet mechanism to cause the gate to open to one side or the other, said ratchet means being provided with means to hold the same in either reverse position.

5. The combination with a main post and spaced stop posts disposed in alinement; of a gate hinged to said main post, a latch post cooperative with the free end of the gate, a latch being carried by the post, means carried by the gate for releasing said latch and for holding the same in engaged position, a horizontally swingable ratchet member carried by the main post and provided with arms extending radially therefrom, a cable connected to the extremities of said arms and bent upon itself, a pulley around which said cable operates, said pulley being connected to the latch operated means, a spring between the pulley and the free end of the gate, operating cables connected with the arms and provided with means for exerting pull thereon at one side or the other to raise or lower the same in opposite directions and cause pull on the pulley cable at one side or the other to release said latch and expand said spring, to cause the gate to swing to one side or the other against one of said stop posts and to close the same, arms carried by certain of said posts, means carried by said arms for movably supporting said cables, cable operated means for reversing the position of said ratchet means, and means for adjusting the positions of said arms angularly with respect to the posts.

ABRAHAM GRADUS MAASDAM.